US012777993B2

(12) United States Patent
Hoellinger et al.

(10) Patent No.: US 12,777,993 B2
(45) Date of Patent: Nov. 3, 2026

(54) METHOD AND FACILITY FOR WORKING A PLOT OF LAND WITH AT LEAST TWO AGRICULTURAL ROBOTS

(71) Applicant: KUHN SAS, Saverne (FR)

(72) Inventors: Marie Hoellinger, Rimling (FR); Philippe Potier, Zittersheim (FR)

(73) Assignee: KUHN SAS, Saverne (FR)

( * ) Notice: Subject to any disclaimer, the term of this patent is extended or adjusted under 35 U.S.C. 154(b) by 32 days.

(21) Appl. No.: 18/863,075

(22) PCT Filed: May 15, 2023

(86) PCT No.: PCT/EP2023/062908
§ 371 (c)(1),
(2) Date: Nov. 5, 2024

(87) PCT Pub. No.: WO2023/222573
PCT Pub. Date: Nov. 23, 2023

(65) Prior Publication Data
US 2025/0295049 A1 Sep. 25, 2025

(30) Foreign Application Priority Data
May 16, 2022 (FR) ....................................... 2204629

(51) Int. Cl.
*A01B 69/04* (2006.01)
*G05D 1/692* (2024.01)
(Continued)

(52) U.S. Cl.
CPC ........... *A01B 69/008* (2013.01); *G05D 1/692* (2024.01); *G05D 1/6987* (2024.01); *G05D 2107/21* (2024.01)

(58) Field of Classification Search
CPC .... A01B 69/008; G05D 1/692; G05D 1/6987; G05D 1/0027
See application file for complete search history.

(56) References Cited

U.S. PATENT DOCUMENTS

2021/0339768 A1* 11/2021 Kakkar ................ G05D 1/6484
2024/0345603 A1* 10/2024 Fujii .................... A01B 69/007

FOREIGN PATENT DOCUMENTS

JP 2019141103 A * 8/2019
JP 2020-18262 A 2/2020
(Continued)

OTHER PUBLICATIONS

International Search Report & Written Opinion issued on Sep. 26, 2023, in PCT/EP2023/062908 filed on May 15, 2023, 14 pages (With English Translation).

*Primary Examiner* — Adam D Tissot
*Assistant Examiner* — Jack R Brewer
(74) *Attorney, Agent, or Firm* — Oblon, McClelland, Maier & Neustadt, L.L.P.

(57) ABSTRACT

A method for working a plot of land by two autonomous agricultural robots, the method including: for one robot in question arriving at the end of a row, and likely to find itself in a waiting situation, completing the work in progress in the main field in its current row, by bringing its tool or tools to the end of the row and therefore to the edge portion in question of the main field, projecting into the headland portion adjoining this edge portion, then in moving backwards in the main field, at least until the robot and its tool or tools are once again located entirely in the main field, in remaining in place and then in resuming the rest of its work on the plot.

9 Claims, 8 Drawing Sheets

(51) Int. Cl.

| | |
|---|---|
| ***G05D 1/698*** | (2024.01) |
| ***G05D 107/20*** | (2024.01) |

(56) References Cited

FOREIGN PATENT DOCUMENTS

| | | | |
|---|---|---|---|
| JP | 6854847 | B2 | 4/2021 |
| WO | WO 2018/163615 | A1 | 9/2018 |

* cited by examiner

METHOD AND FACILITY FOR WORKING A PLOT OF LAND WITH AT LEAST TWO AGRICULTURAL ROBOTS

The present invention relates to the agricultural machinery field and more particularly to the working of the soil and/or plants of a plot of land by highly automated autonomous agricultural machines, usually referred to as automated agricultural vehicles or agricultural robots, preferably by a fleet of at least two such vehicles or machines.

In this context, the object of the invention is a method for working a plot of land by at least two agricultural robots with each robot handling each work zone assigned to it continuously and in full, as well as an agricultural implement using this work method.

Figure 1A:
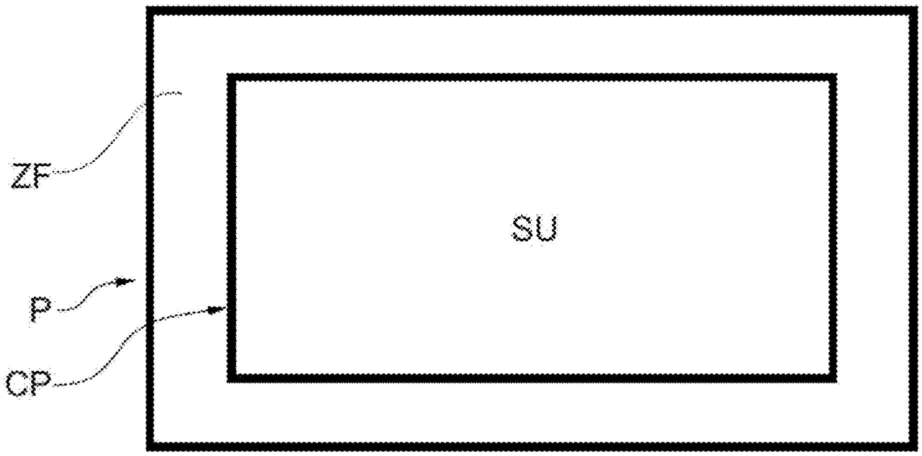
Figure 1B:
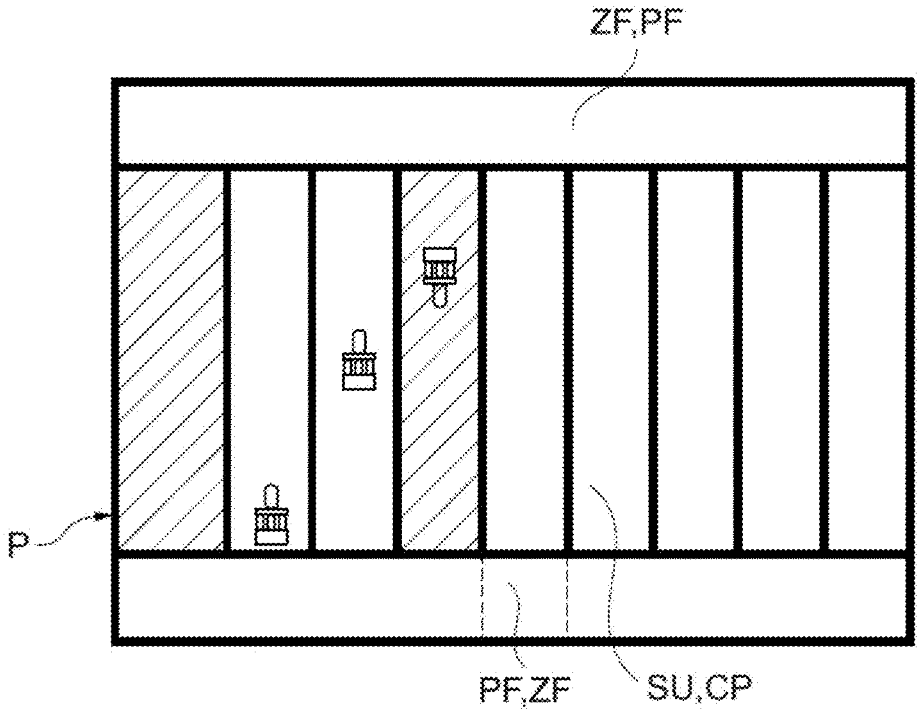
Figure 1C:
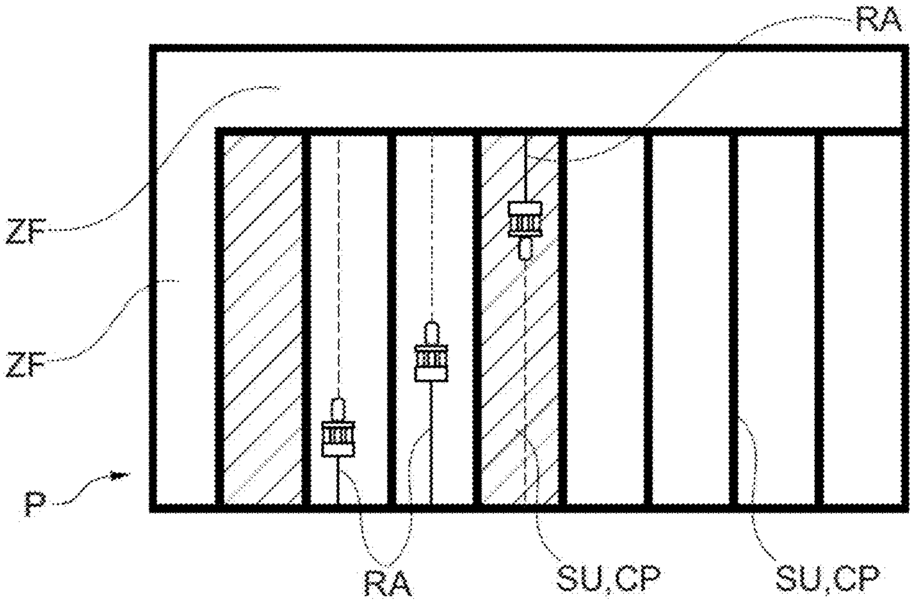
Figure 1D:
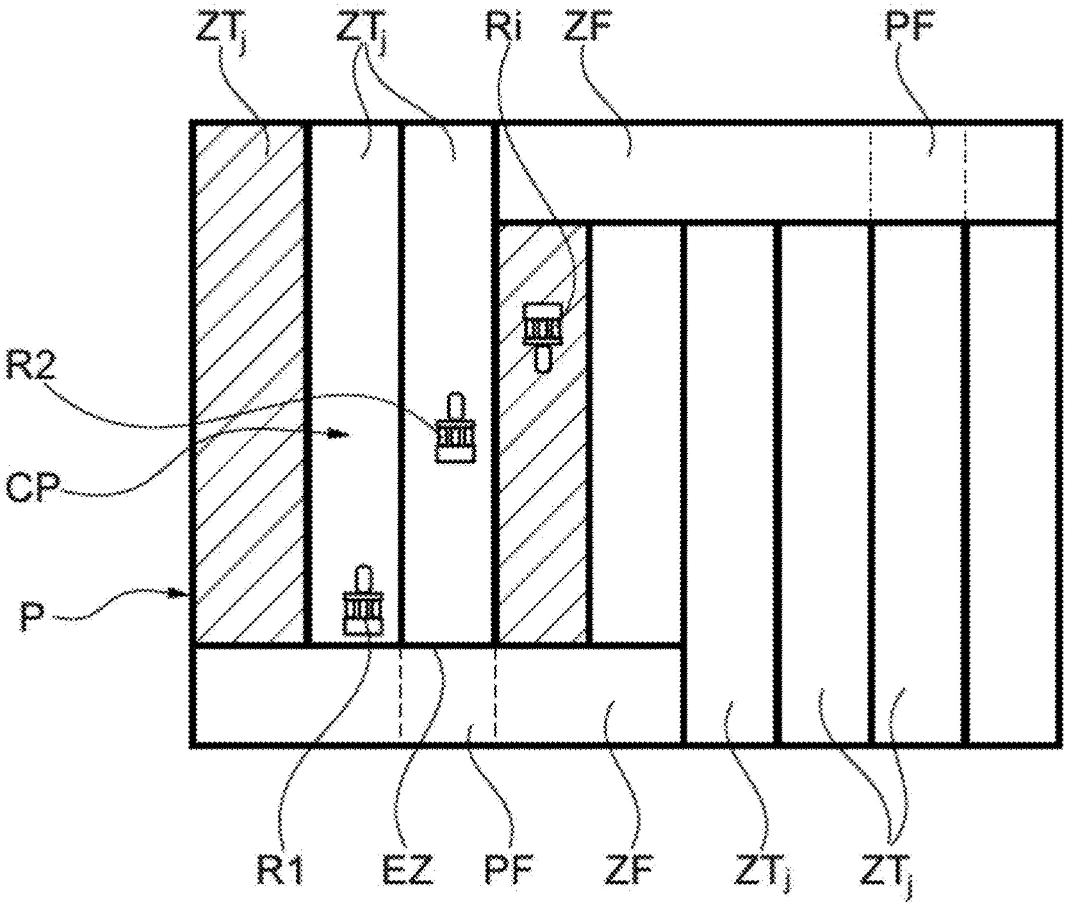
Figure 1E:
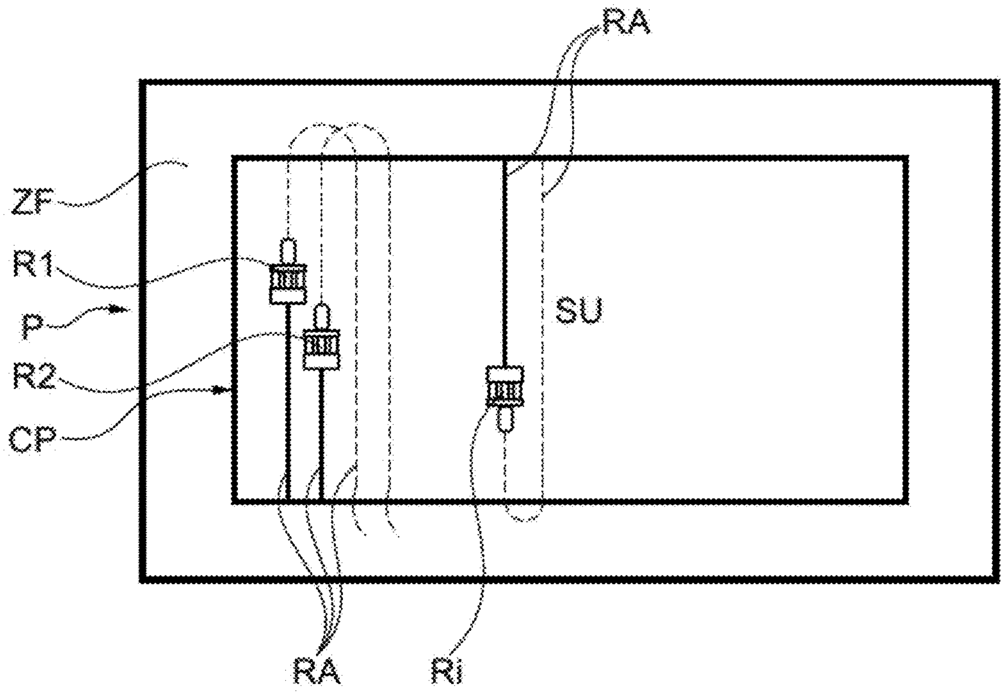

Typically, a plot of land P (usually substantially rectangular, but which can also be any parallelepipedal shape) is divided into a main field CP (corresponding to the optimally usable surface SU) and at least one headland zone ZF which borders this main field on all or part of its peripheral circumference (see FIGS. 1A and 1E—headland around the entire periphery of the field CP). This headland zone ZF can be continuous and entirely bordering SU or CP, as in FIG. 1A: it then extends on all sides of the main field. It may also extend only along certain sides of the main field, or even only along one side, being fragmented (as in FIG. 1B) or continuous (see FIG. 1C). It may finally also extend over part of a side only (see FIG. 1D).

A known solution for working the main field CP consists of dividing it, as shown in FIGS. 1A to 1D, into work zones (ZTj, where j varies from 2 to n) in the form of strips (normally of fixed width for the entire length, but possibly of differing widths) corresponding to the working width of the agricultural robots used (each zone is worked in a single pass or row RA, for example), or to a multiple (preferably a whole number) of this width (each zone is then worked by the robot in an even or odd number of passes or rows RA), and assigning or pre-assigning these zones to the different robots, preferably exclusively (a zone is assigned exclusively to one robot). The planned paths followed by the robots when working in these zones are commonly referred to as "rows".

The aforementioned work zones can be assigned/reassigned in real time depending on the progress of the work by the various robots and changes to the situation while working the plot. The aforementioned work zones, which constitute fractional portions of the main field, can be assigned (for a given work phase or assignment of a plot of land) either exclusively to a single robot of a fleet to be worked upon by said robot, or alternatively to several robots which work it simultaneously or successively, performing identical or similar, different or even complementary tasks. The robots work on these zones, advantageously making at least one round trip in each zone.

Alternatively, as shown in FIG. 1E, the usable surface SU (main field CP) can also be worked without being sub-divided into several work zones (in other words, CP or SU is a single work zone, which is not sub-divided, worked as a single unit and simultaneously by the various robots), the management of the robots then taking place on the basis of the rows RA carried out by and planned for each robot (parts of rows completed in solid lines on FIGS. 1E and 1C, and parts of rows to be completed in dashed lines on these figures).

Traditionally, a headland zone is present on at least one, advantageously several, side(s) of the main field and preferably at least at each end of the work zones, and therefore the rows or working paths of the plot. This is primarily used by the agricultural vehicles or robots to make U-turns and, more generally, to maneuver from one row to another in the main field, but also to enter/exit the plot, or to refuel or top up with input at a supply station located in a portion of a headland zone or outside the plot (for example on the side of an access path to the plot). The headland zones are also worked, usually last, after all the work zones of the plot or usable surface SU.

More specifically, the invention is aimed at a context in which movements are managed by a monitoring system/software that knows in advance all the trajectories (rows) that the various robots will take, and also knows in real time the positions of each robot while working (the robots do not directly communicate with each other). The invention is particularly applicable in the context described in documents FR 3114215 and FR 3114217, when the usable surface is sub-divided into several work zones (FIGS. 1B to 1D, 2 and 3), but is also applicable when the usable surface is not sub-divided (FIGS. 1A and 1E).

In most cases, the robots are (at least) equipped with rear-mounted tools in the direction of advance while working.

However, such a configuration means that, in order to work a row or zone in full, in other words all the way to the end (adjacent to the headland), the robot has to encroach from the current work zone or usable surface, in other words the main field, and enter (at least partially) the headland, in order for the rear tool to reach the end of the row and work the end portion of the corresponding zone.

It is well known to those skilled in the art that the best way to work a row is in a single, uninterrupted pass, from start to finish.

Indeed, depending on the type of agricultural operation carried out, an interruption may involve restarting certain tool sub-systems (seed dosing devices on seed-drills, for example). These sub-systems will not operate optimally for a few meters after a restart, as they need a certain period of time to return to the same setting as before they were interrupted (current operation). This leads therefore to portions of rows, and where applicable corresponding portions of work zones, in which the work of the tools will be inconsistent, or even non-existent, which can consequently mean reduced agricultural yield.

Figure 2A:
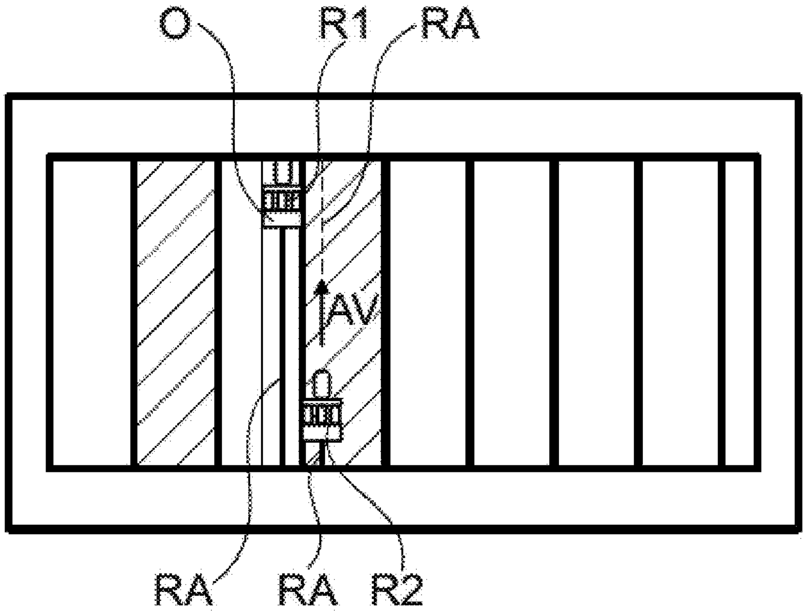
Figure 2B:
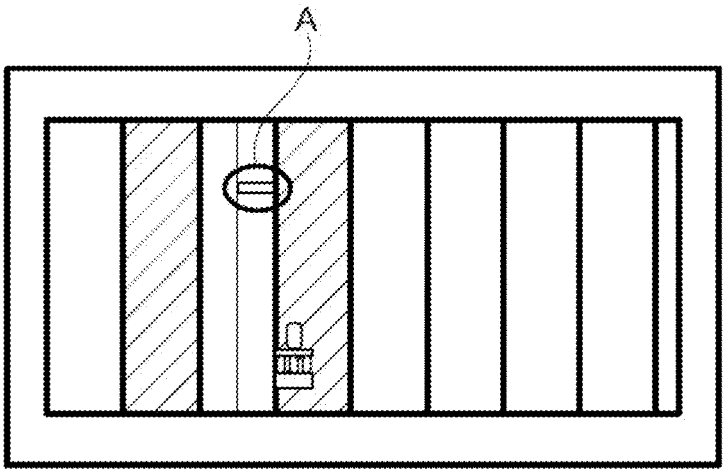

This situation is illustrated schematically by way of example in FIGS. 2A and 2B, in which it can be seen that, following an interruption in the work of robot R1 resulting in it stopping at the position shown in FIG. 2A, a portion of the work zone involved (circled and referenced A) will have been worked in a different way to the rest of the zone after restarting (or even not worked at all).

Stopping work momentarily a the end of a row is often the result of a waiting situation on the part of the robot in question, which can have various causes.

One frequent cause, when working a plot with at least two agricultural robots, is the problem that a first robot R1 may cause by wanting to completely finish its current row, interfering with a second robot R2 passing at that moment in the adjacent headland portion.

Figure 3:
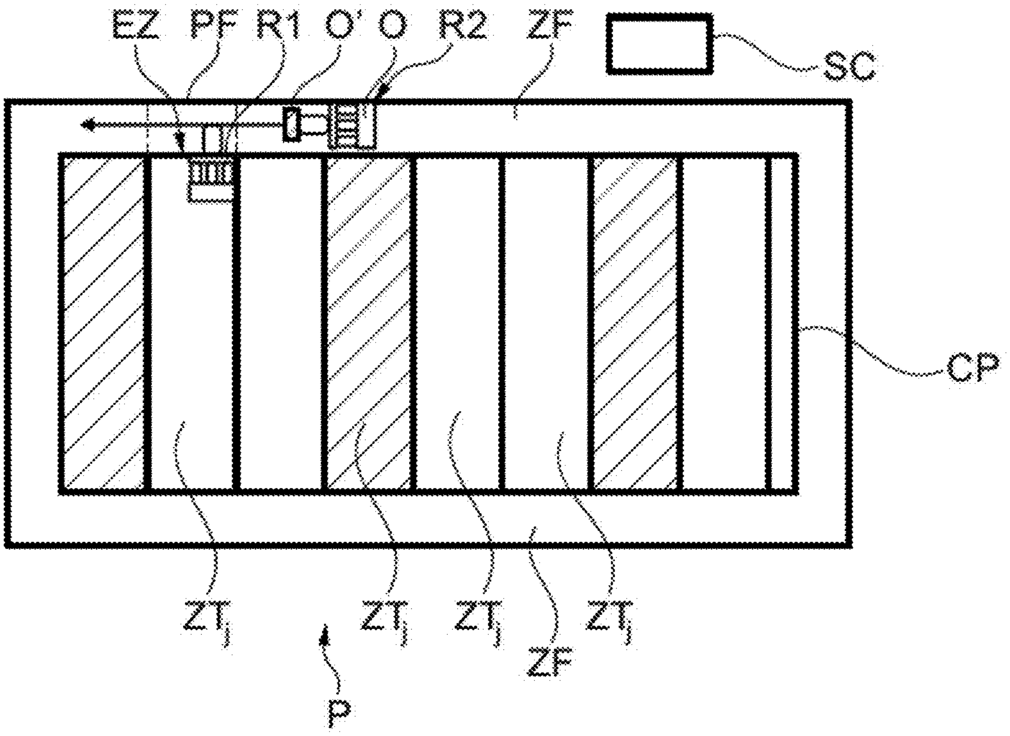

Thus, in the case illustrated schematically by way of example in FIG. 3, the robot R1 finishes its row and is obliged to encroach on the headland so that the rear tool can work the end portion of the corresponding zone. However, robot R2 needs to use the portion of the headland occupied by robot R1 at the same time to move around the plot (for example for supplies or fuel, or to move to a new work zone). Robots R1 and R2 therefore block each other, requiring priority and safety management tools (conflict management logic) to prevent collisions and blockages, especially in this type of situation. Although such tools are inevitably necessary in an automated agricultural work infrastructure with multiple vehicles, there is a high demand to try to limit such situations as far as possible, so as to make it as easy as possible to manage collisions, crossovers and priorities between robots, and to ensure work in the plots of land proceeds smoothly.

This problem is addressed in particular in document EP 3508045, which, as mentioned above, proposes temporarily stopping the robot in the zone worked at the end of the row (to allow the second robot to pass through the critical headland portion). A temporary prohibition on working certain rows, whose access is hindered by a robot stopped in the headland is also mentioned.

Furthermore, document EP 3427562 describes a method in which, to prevent a possible collision, the robot moving in the headland is stopped there, allowing a robot making a U-turn in this headland to pass.

Alternatively, other known solutions exist in documents JP 6854847 B2, JP 2020018262 A1 and WO 2018/163615 A1.

However, none of these known solutions satisfactorily meets the above requirement.

The main purpose of the present invention is to provide a simple and satisfactory solution for optimally meeting the above requirement.

To this end, the subject of the invention is a method for working a plot of land using a fleet of at least two autonomously operating and mutually independent agricultural robots, each of which is equipped with at least one rear-mounted tool in the direction of advance, the fleet operating under the control of a central common planning, management and drive system, the plot comprising at least one headland zone associated with and bordering at least part of one side of the main field, the method consisting, prior to the start of and if necessary during the progress of the work in the plot, and after prior evaluation and planning of the work to be carried out on the plot of land in question, in automatically and/or manually programming each robot with instructions, settings and/or control sequences before starting work in the plot, including in particular movement trajectories for each robot, method characterized in that it consists, for one robot in question arriving at the end of a row, and likely to find itself in a waiting situation, of continuing and completing the work in progress in the main field in its current row, by bringing its tool(s) to the end of said row and therefore to the edge portion in question of the main field, encroaching on the headland portion adjoining this edge portion, then in moving backwards in the main field, at least until the robot and its tool(s) are once again located entirely in the main field, in remaining in place until the conditions or cause of the waiting situation has/have disappeared, and then in resuming the rest of its work on the plot (P).

The invention will be better understood from the following description, which refers to a preferred embodiment given as a non-limiting example and explained with reference to the attached schematic drawings, in which:

FIG. 4A,

FIG. 4B,

FIG. 4C,

FIG. 4D and

Figure 4A:
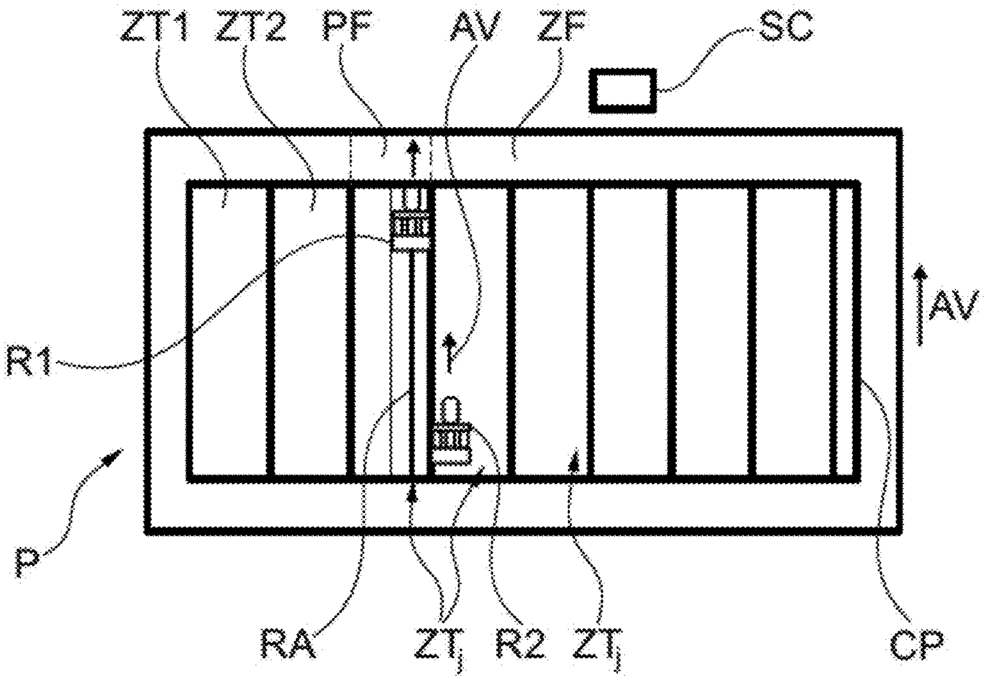
Figure 4B:
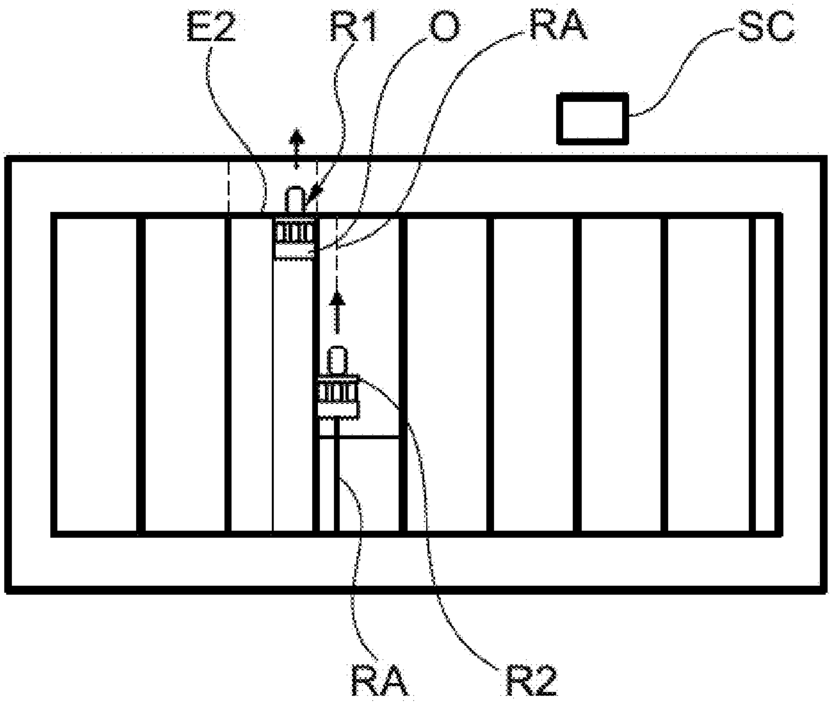
Figure 4C:
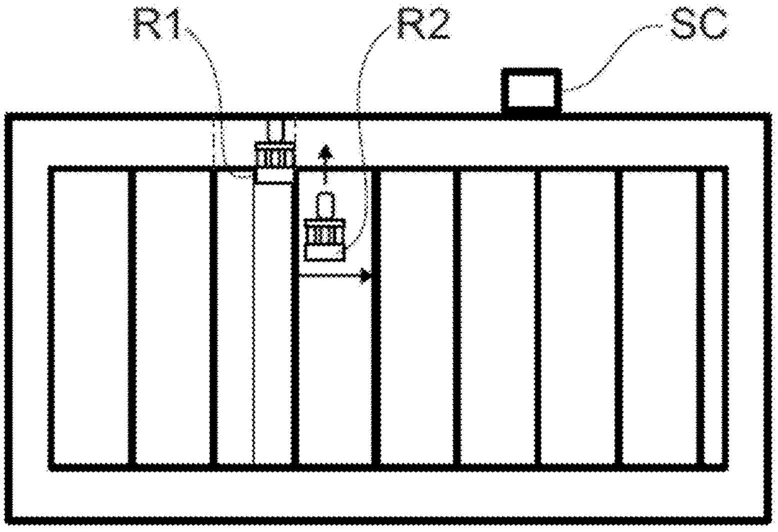
Figure 4D:
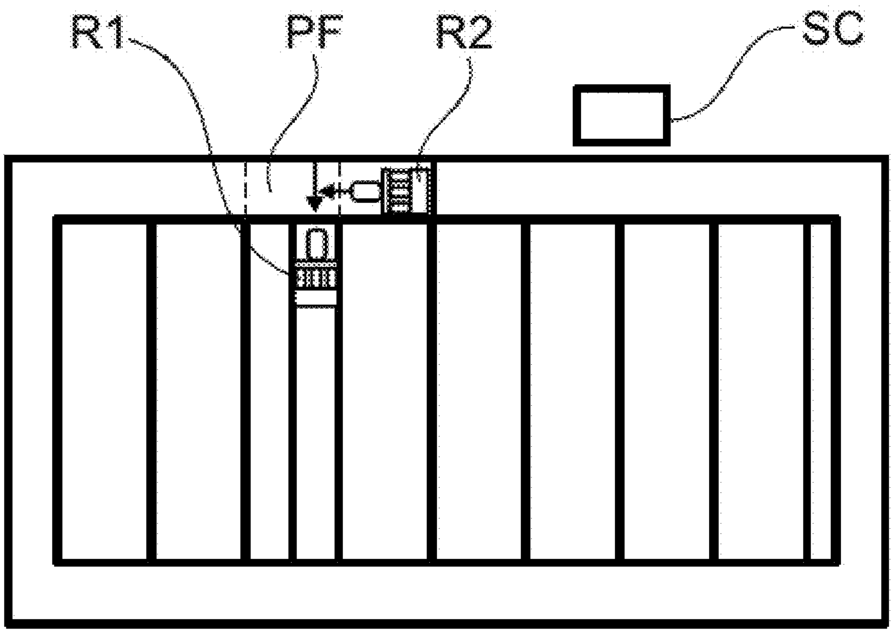
Figure 4E:
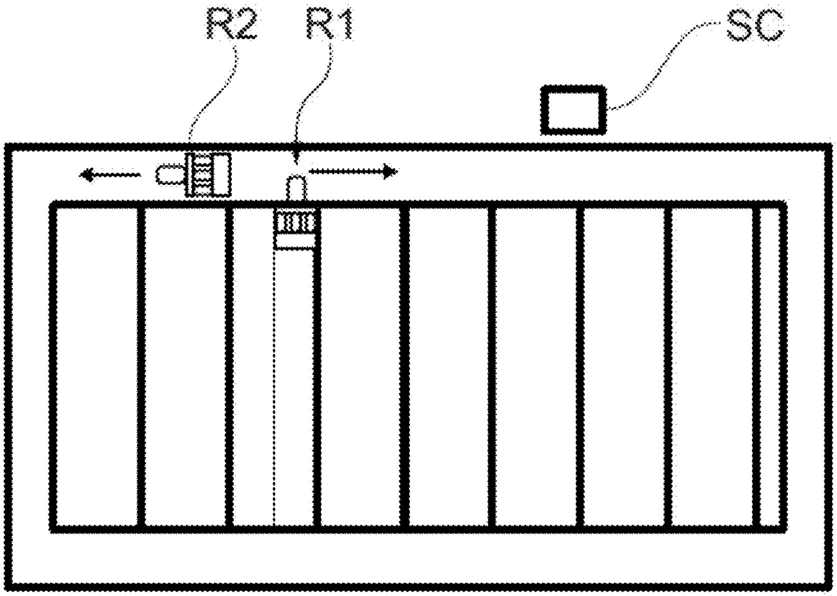

FIG. 4E illustrate schematically and similarly to FIGS. 2 and 3, in top views and with regard to a fleet of two robots, various successive steps of the method according to the invention, corresponding to the actions performed by an agricultural robot in the event of a waiting situation, in accordance with a predefined logic of priority and safety rules.

The invention generally relates to a method of working a plot (P) using a fleet of at least two autonomously operating and mutually independent agricultural robots (R1, R2, . . . , Ri, etc.), each of which being equipped with at least one tool (O) mounted at the rear with regard to the direction of advance (AV). This fleet operates under the control of a central common planning, management and drive system (SC), known to those skilled in the art as such, and the plot (P) comprising at least one headland zone (ZF) associated with and bordering at least part of one side of its main field (CP).

This method consists, prior to the start of and if necessary also during the progress of the work in the plot (P), and after prior evaluation and planning of the work to be carried out on the plot (P) in question, in automatically and/or manually programming each robot (R1, R2, . . . , Ri, etc.) with instructions, settings and/or control sequences before starting work in the plot (P), including in particular movement trajectories for each of them (constituting the rows in the main field).

In accordance with the invention, this method consists, for one robot (Ri) in question arriving at the end of a row (RA), and likely to find itself in a waiting situation, of continuing and completing the work in progress in the main field (CP) in its current row (RA), by bringing its tool(s) (O) to the end of said row (RA) and therefore to the edge portion (EZ) in question of the main field (CP), encroaching on the headland portion (PF) adjoining this edge portion (EZ), then in moving backwards in the main field (CP), at least until the robot (Ri) and its tool(s) (O) are once again located entirely in the main field (CP), in remaining in place until the conditions or cause of the waiting situation has/have disappeared, and then in resuming the rest of its work on the plot (P).

Thanks to these arrangements, the invention makes it possible to simply and effectively overcome the problem associated with a waiting situation for a given robot, with little or no impact on the operation of the other robot(s): the robot in question no longer constitutes an obstacle in the headland and can nevertheless work the current row in an optimal manner. It is understood that the invention can apply as soon as the end of a row (RA) leads to a headland portion (PF), but, of course, is not systematically applied (only when the conditions of a waiting situation are met). The invention therefore guarantees consistent work over the entire length of the row (RA) for all rows (regardless of whether or not there is a waiting situation), prevents collisions in the headland zone and facilitates the management of crossovers between robots.

In accordance with one advantageous, simultaneously flexible and secure embodiment alternative, the fulfillment of the conditions or the existence of a cause leading to a waiting situation for a given robot (Ri) is verified by the same robot (Ri) when it reaches the end of the current row and approaches an adjoining headland portion (PF), and the subsequent execution by this robot (Ri) of actions in relation to a proven waiting situation is dependent on prior safety checks carried out by this robot (Ri).

According to an alternative embodiment, and with regard to an advanced centralized control of the fleet and possible limited robot sophistication, a given robot (Ri) is informed of the existence of a waiting situation by the central common planning, management and drive system (SC).

To minimize crushing of sown crops (sowing or post-sowing plant treatment) at most, it is advantageously planned for the robot (Ri) in question to move backwards along the same trajectory as that used to complete work at the end of its current row (RA), in the opposite direction.

Alternatively, and in order to limit soil compaction (no risk of crushing seedlings or plants, soil working operations such as plowing, tillage, harrowing, etc.), it can be envisaged for the reverse movement of the robot (Ri) in question to follow a different trajectory from that taken to complete the work at the end of its current row (RA), preferably laterally offset by at least the width of the track of a means of moving said robot. Loads impacting the soil are therefore better distributed.

Preferably, the at least one tool (O) is inactive, and raised if necessary, when the robot (Ri) in question moves backwards.

According to a first embodiment, illustrated by FIG. 4 and related for example to the methods described in documents FR 3114215 and FR 3114217, the method may consist, prior to the start of work in the plot (P) and if necessary during the progress of the work in the plot (P), in sub-dividing the main field (CP) into work zones (ZT1, ZT2, . . . , ZTj, . . . ) in the form of strips, at least one end of which, corresponding to an edge portion (EZ) of the main field (CP), extends by a portion (PF) of the or of one of the headland zone(s) (ZF), and each of which is assigned to one of the robots (R1, R2, . . . , Ri, . . . ) to be worked by it in its longitudinal direction in one or more pass(es) or row(s), advantageously in at least one round trip.

According to a second embodiment, and in relation to a plot as illustrated in FIG. 1E, the main field (CP) is not sub-divided, is considered by the system and the robots as a single, but non-exclusive, work zone, and can be worked simultaneously by several or all of the robots in the fleet (increased vigilance of safety systems to prevent collisions). The route will be planned with the necessary round trips for each robot in the main field, so as to work it in full. These instructions will then be sent by the monitoring system (SC) to the various robots. The work distribution between the robots in this single zone takes place when generating the paths and instructions, which will be sent to the various robots involved.

In this second embodiment, several working scenarios can be envisaged (illustrated below with an example of a fleet of three robots Ri, with i varying from 1 to 3):

- if agricultural operation identical for all robots in the main field (CP): in this case, each robot works in a portion of CP (for example, when two robots are present to work in CP, then the left half can for example simply be assigned to one, and the right half to the other).
- if different and successive agricultural operations for all robots in the main field (CP): all robots then follow an identical or virtually identical path, but staggered over time (with a delta of X meters/round trips/minutes between two successive robots), and they all work the entire main field (CP). Example of application for a fleet of three robots (i=1 to 3): R1 uses a stubble cultivator, R2 a rotary harrow and R3 a seed-drill.

If the robot (Ri) in question also has at least one front-mounted tool (O'), it is advantageously planned to move backwards in the main field (CP), if necessary in the work zone (ZTj) in question, at least until the at least one front-mounted tool (O') is located entirely within the main field, or the zone (ZTj).

In order to achieve a high degree of automation, the method may consist, when programming each robot (R1, R2, . . . , Ri) with instructions and/or control sequences prior to starting work in the plot (P), in also defining for each robot the features of the reversing operations that may be carried out in a waiting situation, in particular their extent and the type of their trajectory, namely a reversing trajectory that is coincident with or offset from the immediately preceding forward trajectory used to finish the row (RA).

In accordance with the invention, and to enable a wide variety of possible scenarios to be handled, the possible conditions or causes of a waiting situation for a given robot (Ri) in a fleet are preferably multiple and are, for example, linked to the robot (Ri) in question itself, to the organization of the fleet, to the progress and state of work in the plot (P) and/or to instructions from the central common planning, management and drive system (SC) or from an operator.

Therefore, for a given robot (Ri) (i=1 in FIG. 4), it is possible to anticipate for example the following circumstances as conditions for waiting at the end of the row (RA), resulting in the application of the principle of the invention (in the presence of a headland):

- Ri is waiting for an instruction from the user (or the monitoring system SC) to send it to a supply station or a parking zone (usually each located at a predefined place in the headland).
- Ri has finished its assigned task and is waiting until the mission is completely finished (in other words all robots have completed their tasks) before returning to its parking zone outside the main field.
- The logic for managing passing priorities has determined that another robot Rj (j=2 in FIG. 4) has priority over Ri, and Ri moves back so as not to form an unnecessary obstacle in the headland (temporary stop in the row for Ri).
- A fault has been detected on Ri (and/or one of its tools O or O') which requires a non-immediate stop. The robot Ri then finishes its row and waits at the end of the latter until the problem has been resolved before resuming its work.

The invention also relates to an agricultural machinery assembly for implementing the automated method for working on plots of land (P), as described above.

This assembly comprises firstly a fleet of at least two autonomously operating and mutually independent mobile agricultural robots (R1, R2, . . . , Ri), each of which is equipped with at least one suitable work tool (O) mounted at the rear in the direction of advance (AV), and secondly a central common planning, management and drive system (SC) capable of and intended to evaluate and plan the work to be carried out on a plot (P) in question and to communicate with said robots in order to send them instructions and/or control orders, and if necessary receive in return operating and/or status information from said robots (R1, R2, . . . , Ri), prior to the start of and if necessary during the work on the plot (P) in question, each robot (R1, R2, . . . , Ri) furthermore being provided with a positioning device and, possibly with input stock and autonomy measuring means based on its current and estimated future consumption.

This assembly is characterized in that each robot (R1, R2, . . . , Ri) is configured and programmed to perform a predetermined sequence of actions as mentioned above when it finds itself in a waiting situation.

Of course, the invention is not limited to the example embodiment described and shown in the attached drawings. Modifications remain possible, in particular as regards the composition of the various elements or the substitution by technical equivalents without departing from the scope of protection of the invention.

The invention claimed is:

1. A method for working a plot of land by a fleet of first and second autonomously operating and mutually independent agricultural robots, each of which is equipped with a rear-mounted tool in a direction of advance, the fleet operating under the control of a central common planning, management and drive system, the plot comprising a headland zone associated with and bordering part of one side of a main field, the method comprising:

programming each robot with at least one of instructions, settings, and control sequences before starting work in the plot, including movement trajectories for each robot, and when the first robot arrives at an end of a current row and it is determined that a predetermined situation involving the second robot will occur, controlling the first robot to continue and complete the work in progress in the main field in the current row by bringing the tool of the first robot to the end of the current row and so that the tool of the first robot is at an edge portion of the main field, encroach on the headland portion adjoining the edge portion, move backwards in the main field depending on the tool of the robot so that the first robot and the tool of the first robot are located entirely in the main field, remain in place until the predetermined situation involving the second robot has occurred, and resume work on the plot, wherein a trajectory of a backwards movement performed by the first robot is based on a type of tool equipped, wherein the first robot moves backwards along a same trajectory as a trajectory taken to complete the work at the end of the current row when the tool is a sowing tool or a post-sowing plant treatment tool, and wherein the first robot moves backwards along a different trajectory than the trajectory taken to complete the work at the end of the current row when the tool is a soil working operation tool.

2. The method according to claim 1, wherein the first robot verifies that the predetermined situation involving the second robot will occur when the first robot reaches the end of the current row and approaches an adjoining headland portion, and the first robot carries out prior safety checks before bringing the tool of the first robot to the end of the current row.

3. The method according to claim 1, wherein the first robot is informed of the predetermined situation involving the second robot by the central common planning, management and drive system.

4. The method according to claim 1, wherein the different trajectory is laterally offset by at least a width of a track of the first robot.

5. The method according to claim 1, wherein the tool of the first robot is inactive, and raised if necessary, when the first robot moves backwards.

6. The method according to claim 1, further comprising sub-dividing the main field into work zones in the form of strips, at least one end of which, corresponding to an edge portion of the main field, extends by a portion of the headland zone, and each strip is assigned to be worked by one of the first and second robots.

7. The method according to claim 1, wherein the first robot includes a front-mounted tool, and the first robot moves backwards until the front-mounted tool is located entirely within the main field.

8. The method according to claim 1, wherein possible conditions or causes for the predetermined situation are multiple and are linked to at least one of the first robot or the second robot, to an organization of the fleet, to progress and state of work in the plot, and to instructions from the central common planning, management and drive system or from an operator.

9. An agricultural machinery assembly for the implementation of the automated method of working plots of land according to claim 1, the assembly comprising:

a fleet of first and second autonomously operating and mutually independent mobile agricultural robots, each of which is equipped with a work tool mounted at a rear thereof in a direction of advance, a central common planning, management and drive system configured to evaluate and plan the work to be carried out on a plot in question and to communicate with the robots in order to send the robots instructions and/or control orders, wherein each robot is configured and programmed to perform a predetermined sequence of actions when in a waiting situation.

* * * * *